June 9, 1925.

C. M. FORD

VEHICLE CONTROL

Filed July 31, 1922

Inventor
Clyde M. Ford
King Harness
Attorney

June 9, 1925.
C. M. FORD
VEHICLE CONTROL
Filed July 31, 1922 2 Sheets-Sheet 2
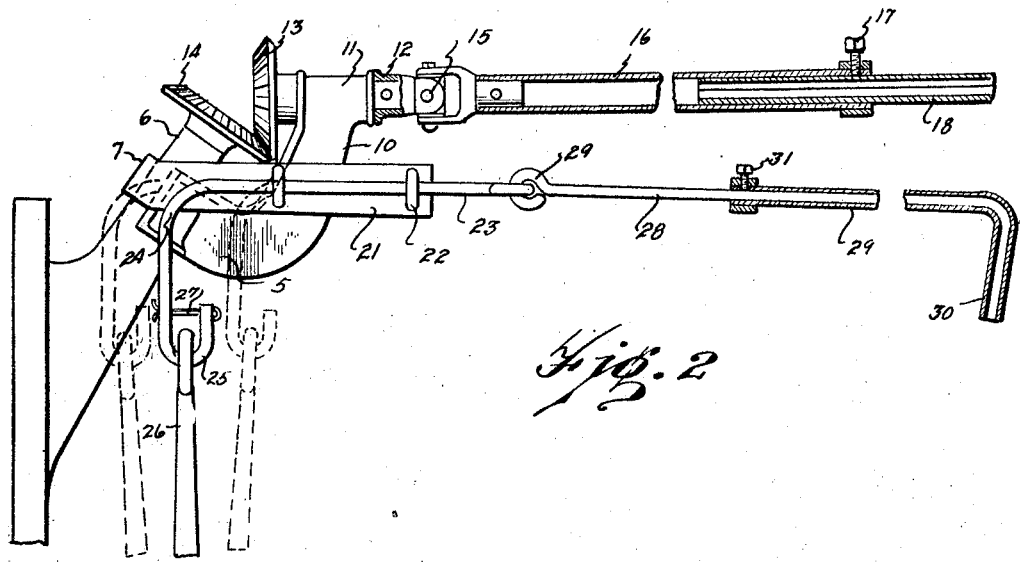
Fig. 2
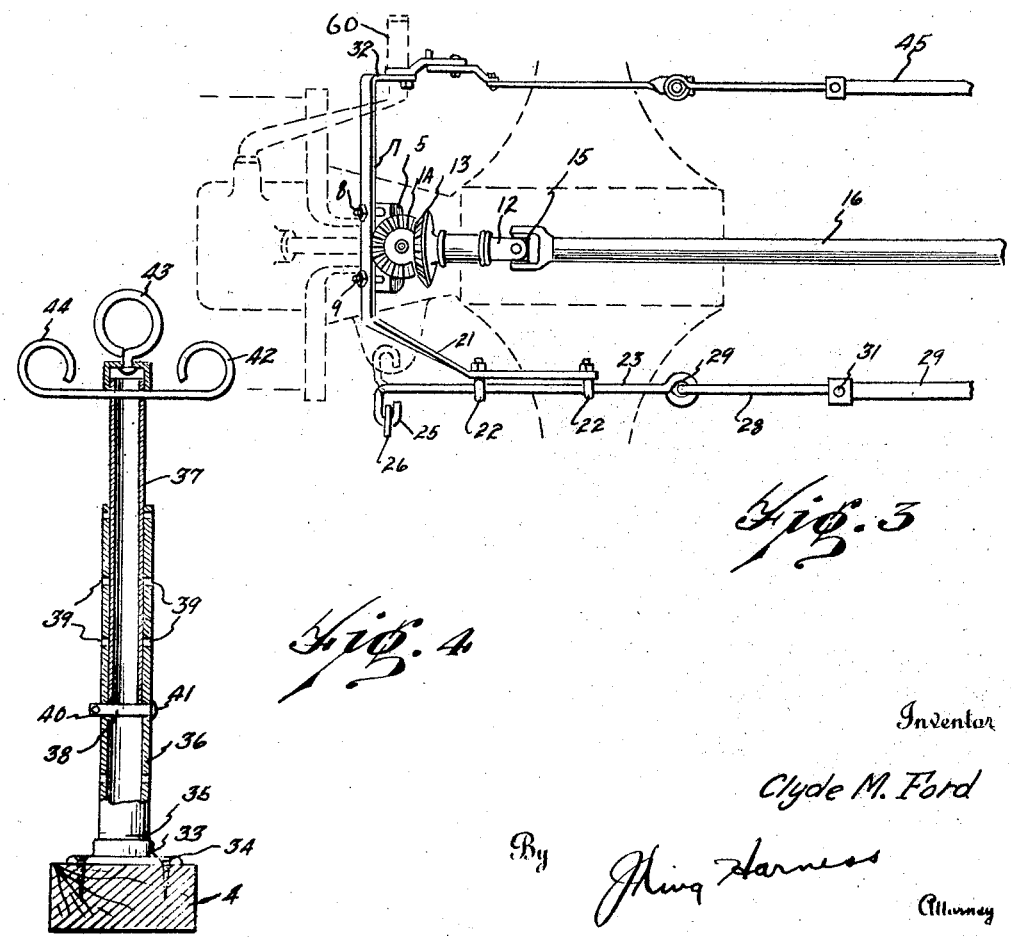
Fig. 3
Fig. 4
Inventor
Clyde M. Ford
By
Attorney Patented June 9, 1925.

1,541,038

UNITED STATES PATENT OFFICE.

CLYDE M. FORD, OF DEARBORN, MICHIGAN.

VEHICLE CONTROL.

Application filed July 31, 1922. Serial No. 578,615.

*To all whom it may concern:*

Be it known that I, CLYDE M. FORD, a citizen of the United States, and resident of Dearborn, in the county of Wayne and State of Michigan, have invented certain new and useful Improvements in Vehicle Controls, of which the following is a specification, reference being had to the accompanying drawings.

My invention relates to a control mechanism for vehicles somewhat similar in nature to the control disclosed in my co-pending application, Serial No. 518,180, filed on November 28th, 1921.

The objects of the present invention are similar to those disclosed in my said co-pending application with the exception of certain improvements thereon.

It is one of the objects of my present invention to provide a simplified method of supporting the forward ends of the extension controls.

It is a still further object of my invention to provide a simplified method and means for supporting the rearward end of said controls.

It is a still further object of my invention to provide a simplified control for the change speed mechanism of the vehicle.

With these and other objects in view, my invention consists in the arrangement, combination and construction of the various parts of my improved device as described in the specification, claimed in my claims and shown in the accompanying drawings, in which:

Fig. 2 is a side elevation showing the forward supporting means for my control.

Fig. 3 is a plan view showing my improved mechanism with certain parts cut away.

Fig. 4 is a side elevation with certain parts shown in section of the rearward support for my improved mechanism.

Figure 1:
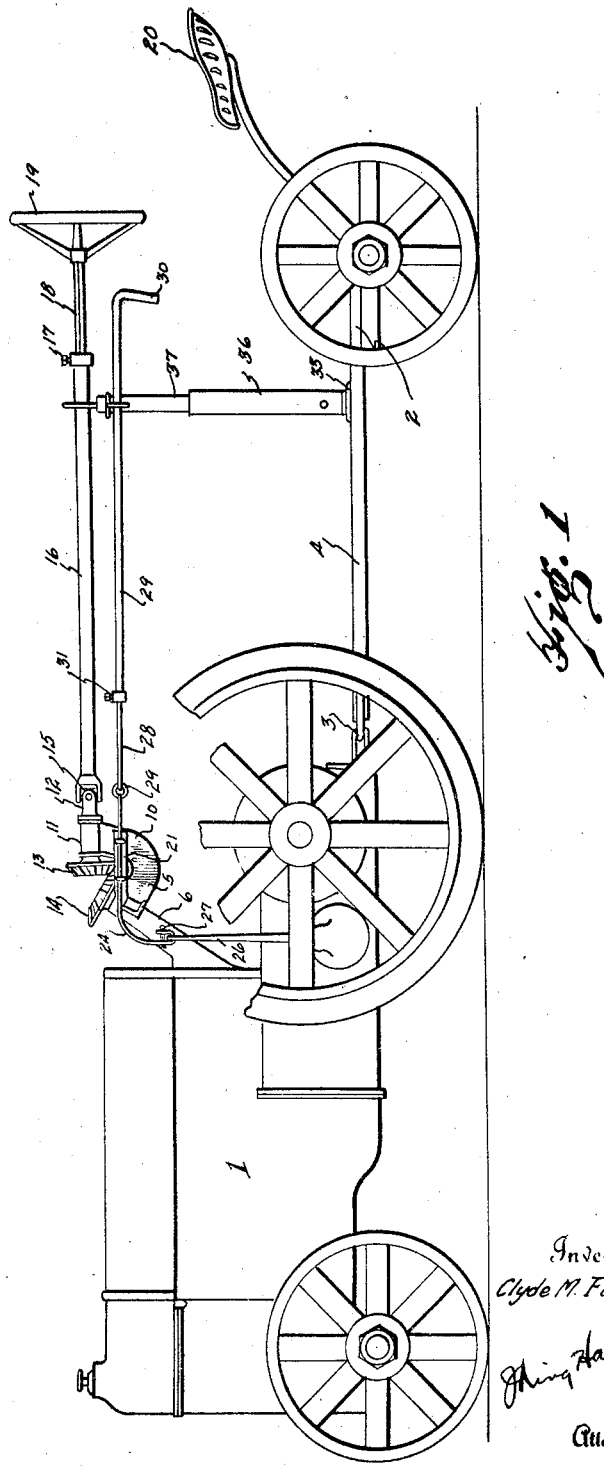
Fig. 1 is a side elevation of a tractor showing my improved control thereon.

I have shown a tractor 1 having a work implement 2 attached rearwardly thereof as at 3 by the shaft 4 of the work implement.

I have provided a somewhat U-shaped member 5 adapted to partially encircle the steering post 6 of the tractor and a cross member 7 secured to the ends thereof by means of the bolts 8 and 9.

The U-shaped member 5 is provided with an integral upwardly extending portion 10 having a bearing 11 on the upper end thereof within which the rod 12 is positioned. The rod 12 is provided on one end thereof with a gear 13 adapted to mesh with the gear 14 on the end of the steering mechanism of the tractor and is connected at the other end thereof through the universal joint 15 to the rod 16 extending rearwardly of the tractor.

I provide a set screw 17 on the outer end of the rod 16 and adapted to bear against one of the angular sides of a rod 18 whose inner end extends within the rod 16 and whose outer end is provided with a steering wheel 19.

It will thus be seen that I have provided means whereby the tractor may be steered from the driving seat 20 on the work implement and whereby the length of the extension steering device may be controlled by moving inwardly or outwardly the rod 18 within the rod 16. It will also be seen that by reason of the rod 18 being square or of other angular form, the bolt 17 may securely hold the same against rotation within the rod 16 by reason of its bearing against one of the flat sides of the said rod 18.

I provide further an arm 21 integral with the cross member 7 and provided with eyelets 22 through which a rod 23 may pass. The rod 23 is bent on its forward end as at 24, and provided with a hooked end 25 adapted to engage with the end of a gear shift lever 26 and to be secured against displacement therefrom by means of a cotter pin 27.

I further provide a rod 28 secured to the rod 23 as at 29 and adapted to slip into the hollow rod 29 having a handle 30 on the end thereof whereby it may be operated. The rod 28 is secured in any desired length within the rod 29 by means of the set screw 31 provided on the forward end of the rod 29 and adapted when screwed downwardly to engage the rod 28. Thus, by twisting or by pulling or pushing on the handle 30, the movement of the gear shift lever 26 may be controlled as shown by the dotted lines in Fig. 2.

The cross member 7 is further provided with an arm 32 adapted to support a clutch operating mechanism attached to the clutch pedal 60, similar in all respects to the clutch operating mechanism disclosed in my said co-pending application. The clutch operating mechanism as is shown in Fig. 3 of the drawings is a series of connected levers extending from the clutch pedal to the rod 45 with the arm 32 acting merely as a support or pivot point. The operation of the clutch mechanism is specifically claimed in my said co-pending application, and inasmuch as no claim is made thereto in said application it is not deemed necessary to here detail its construction.

For the rearward support of my controls, I provide a member 33 adapted to be permanently secured by any suitable means such as the screws 34 to the tongue 4 of the work implement. The said member 33 is provided with a central screw threaded aperture into which the screw threaded end 35 of the hollow support member 36 is adapted to be screwed. I provide a second support member 37 adapted to set within the support member 36 and to be held at any desired height by means of the bolt 38 passing through the desired aligned apertures 39 in the member 36. The bolt 38 may be secured against displacement from the holes 39 by means of a cotter pin 40 passing through one end thereof and by means of a head 41 on the other end thereof.

A supporting member 37 is provided on its upper end with three circular members 42, 43 and 44 through which the control rods 29, 16 and 45, respectively are adapted to pass and thus supported at their rearward ends.

It will thus be seen that a simple and adjustable support for the rearward end of my controlled members is provided and wherein when it becomes necessary to transfer my said control mechanism from one work implement to another, it is necessary only to unscrew the supporting member 36 from the member 33 on the tongue of the work implement and to screw the same into a similar member 33 which may be provided on the work implement to which it is desired to transfer my control mechanism.

It is obvious that various changes may be made in the arrangement, combination, and construction of the various parts of my improved device without departing from the spirit of my invention and it is my intention to cover by my claim such changes as may be reasonably included within the scope thereof.

What I claim is:

A device of the class described, comprising a somewhat U shaped member adapted to partially encircle the steering post of a motor vehicle, a member engaging the ends of said first member and rigidly securing the same to said post and having arms extended therefrom adapted to support one end of an extension gear shift control and an extension clutch control, and a rearward extension on said U shaped member adapted to rigidly support one end of an extension steering device.

CLYDE M. FORD.